Dec. 19 1922.

R. L. CHRISTY.
TIRE DISPLAY FIXTURE.
FEB. 23. 1922.

1,439,147

Witnesses.

Inventor:
Robert L. Christy
per Munn & Co.
Attorneys

Patented Dec. 19, 1922.

1,439,147

UNITED STATES PATENT OFFICE.

ROBERT L. CHRISTY, OF LAMAR, COLORADO.

TIRE-DISPLAY FIXTURE.

Application filed February 23, 1922. Serial No. 538,610.

*To all whom it may concern:*

Be it known that I, ROBERT L. CHRISTY, a citizen of the United States, and a resident of Lamar, in the county of Prowers and State of Colorado, have invented a new and useful Improvement in Tire-Display Fixtures, of which the following is a full, clear, and exact description.

My invention relates to improvements in tire display fixtures, and it consists in the combinations, constructions, and arrangements herein described and claimed.

An object of my invention is to provide a tire display fixture which is adapted to support and to rigidly hold a tire of any size.

A further object of my invention is to provide a device of the character described which is adapted to display both sides and the tread of the tire.

A further object of my invention is to provide a device of the character described which has adjustable means, whereby a small tire or a large tire, such as a truck tire, may be readily supported by the same device.

A further object of my invention is to provide a device of the character described which has means for supporting show cards or articles, such as inner tubes, within the center of the tire.

A further object of my invention is to provide a device of the character described in which the supporting base may be made of various designs, thereby providing a device which affords an attractive display.

A further object of my invention is to provide a device of the type described which is relatively simple in construction, efficient for the purpose intended, and which makes a pleasing appearance to the eye.

Other objects and advantages will appear in the following specification, and the novel features of the invention will be particularly pointed out in the appended claims.

My invention is illustrated in the accompanying drawings, forming part of this application, in which—

Figure 1:
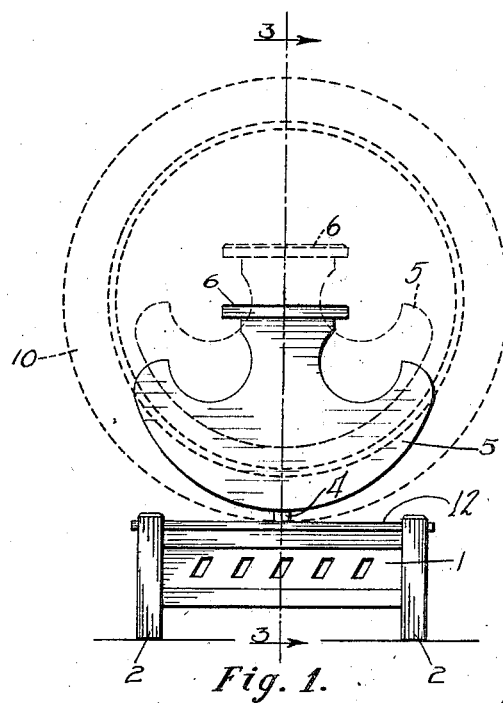
Figure 1 is a front elevation of the device, showing a tire carried thereby.
Figure 4:
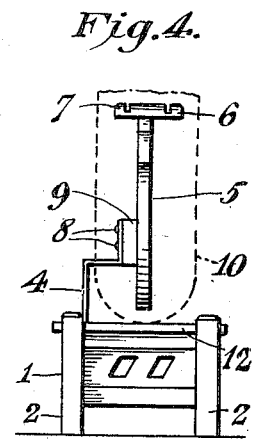
Figure 4 is a side elevation of the device as shown adjusted to hold a truck tire.
Figure 2:
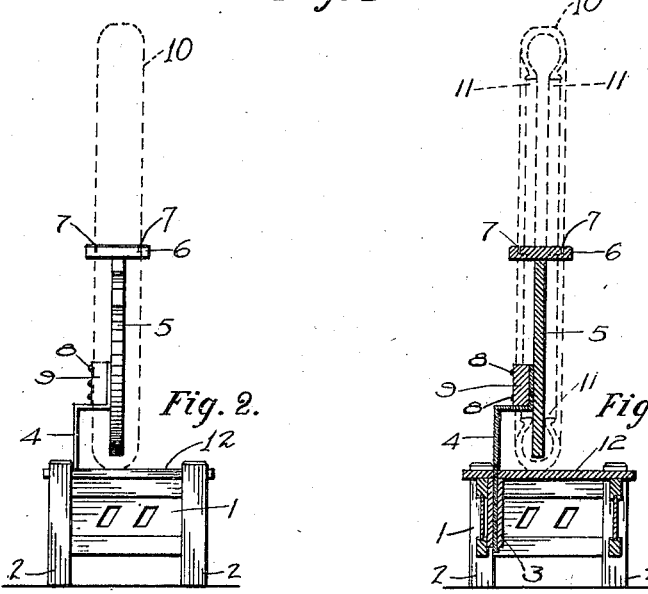
Figure 2 is a side elevation of the device.
Figure 3:
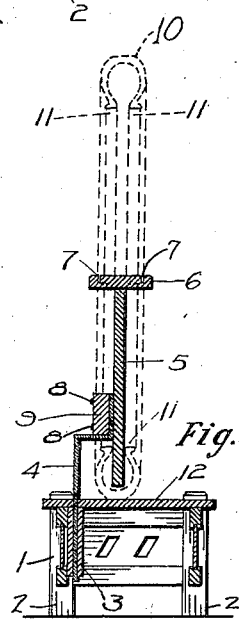
Figure 3 is a section along the line 3—3 of Figure 1.

In carrying out my invention, I provide a base 1 which may be of any design desired. In the present instance, I show the base as being made of wood, and as having a distinctive design. It is obvious that by merely changing the design, the display fixture may be used for various purposes. The legs 2, which support the base 1, are shown to be short, but it is obvious that they may be of any length desired. A guide 3 for a metal supporting bar 4 is provided in the base 1. The bar 4 is L-shaped, as shown in Figure 3, and is adapted to support a tire guiding board or plate 5. It will be seen from Figure 1 that the plate 5 is provided with an arcuate lower edge, and with an artistically fashioned upper edge. The board 5 also supports a card-carrying or small article-carrying stand 6. The stand 6 is disposed in a horizontal plane and is provided with card-receiving grooves 7 therein. The grooves 7 preferably extend parallel with the plane of the board 5, but may be of any other desired angle as required. The support 6 is disposed substantially within the center of the tire when the device supports a tire. The member 4 is secured to the board 5 by means of screws 8. It will be noted from Figure 3 that the screws 8 are first disposed through a block 9, and are then disposed through the member 4 and are secured to the board 5. The device, as illustrated, is adapted to support a tire of normal size. In case, however, a large tire, such as a truck tire, is desired to be supported, the block 9 is disposed between the member 4 and the board 5, so as to move the board 5 nearer to the front of the device.

From the foregoing description of the various parts of the device, the operation thereof may be readily understood. When disposing a tire 10 on the device, the board 5 is raised to the dotted line position shown in Figure 1, so as to clear the bottom of the tire. The tire 10 is then disposed so as to permit the board 5 to enter between the inner sides 11 of the tire. The member 5 is then moved downwardly, so as either to grip the tire between itself and the top 12 of the base 1, or if the board 5 is too small, to cause the member 4 to bear on the inner periphery of the tire. In the present drawing, as is shown in Figure 3, the board 5 bears against the tire instead of the member 4. The support 6 may carry a box containing an inner tube for the tire, or may support a display card (not shown). In this manner, the device supports a tire in the desired position, and also carries means by which the tire may be advertised, if desired. It will be seen from the drawing that the entire sides of the tire and the tread also are visible.

As heretofore stated, in case a tire of larger dimensions, such as a truck tire, is desired to be displayed, the block 9 is disposed between the member 4 and the board 5 so as to bring the board 5 nearer to the front of the base 1. The movement of the board 5 forwardly also provides more space between the board and the member 4, so as to readily receive a tire of larger dimensions. The guide 3 is adapted to frictionally hold the member 4 so as to prevent accidental movement of the member 4 after the device has been adjusted. It will be noted, however, that the guide 3 readily permits the movement of the member 4 therein.

From the foregoing, it will be observed that I have provided a simple and efficient device for supporting a tire of any dimensions. I have also provided a device in which the design thereof may be changed at will so as to provide devices of various shapes. The device is adapted to carry its own advertising matter, as well as the tire, and to support the advertising matter in the desired position, with respect to the tire. The device is novel in constructure, and makes a pleasing appearance to the eye.

I claim:

1. A device of the type described comprising a base, a tire support movably carried by said base, said support being adapted to enter between the sides of a tire and to hold the tire in engagement with said base.

2. A device of the type described comprising a base, a tire support movably carried by said base and being adapted to enter between the sides of a tire and to hold the tire in engagement with said base, a horizontal plate so carried by said support as to be disposed substantially in the center of a supported tire, said plate having card receiving grooves therein.

3. A device of the type described comprising a base, a member slidably carried by said base, a tire support carried by said member, and a block adapted to be disposed between said tire support and said member.

4. A device of the type described comprising a base having a guide therein, a member slidably received in said guide, and a tire support carried by said member, said support being adapted to extend between the sides of a tire and to hold the tire against said base.

5. A device of the type described comprising a base adapted to support a tire, and means carried by said base for holding a tire in adjusted position with respect to said base, said means being adapted to enter between the sides of the tire, whereby the entire tire may be readily seen.

ROBERT L. CHRISTY.